United States Patent
Saito et al.

(10) Patent No.: US 8,571,763 B2
(45) Date of Patent: Oct. 29, 2013

(54) CONSTRUCTION VEHICLE PROVIDED WITH WORK EQUIPMENT

(75) Inventors: Yoshiaki Saito, Kawaguchi (JP); Masatsugu Numazaki, Sayama (JP)

(73) Assignee: Komatsu Ltd., Tokyo (JP)

( * ) Notice: Subject to any disclaimer, the term of this patent is extended or adjusted under 35 U.S.C. 154(b) by 243 days.

(21) Appl. No.: 13/255,340

(22) PCT Filed: Mar. 11, 2010

(86) PCT No.: PCT/JP2010/054079
§ 371 (c)(1), (2), (4) Date: Sep. 8, 2011

(87) PCT Pub. No.: WO2010/104138
PCT Pub. Date: Sep. 16, 2010

(65) Prior Publication Data
US 2011/0318156 A1 Dec. 29, 2011

(30) Foreign Application Priority Data
Mar. 12, 2009 (JP) .................. 2009-060094

(51) Int. Cl.
*G06F 7/70* (2006.01)
(52) U.S. Cl.
USPC ............................................ 701/50; 414/685
(58) Field of Classification Search
USPC ............................................ 701/50; 414/685
See application file for complete search history.

(56) References Cited

U.S. PATENT DOCUMENTS

| 6,205,687 | B1 | 3/2001 | Rocke |
| 2008/0234901 | A1* | 9/2008 | Johnson et al. .............. 701/50 |
| 2010/0095663 | A1 | 4/2010 | Hyodo et al. |

FOREIGN PATENT DOCUMENTS

| JP | 61-155524 A | 7/1986 |
| JP | A-H06-049866 | 2/1994 |
| JP | 2001-146928 A | 5/2001 |
| JP | 2005-146886 A | 6/2005 |
| JP | 2005-248697 A | 9/2005 |
| JP | 2008-223858 A | 9/2008 |

OTHER PUBLICATIONS

The International Search Report mailed on May 25, 2010 for the corresponding International patent application No. PCT/JP2010/054079 (English translation attached).
Extended European Search Report dated Mar. 22, 2012 in corresponding EP Application No. 10750891.3.

* cited by examiner

*Primary Examiner* — Thomas Black
*Assistant Examiner* — Luke Huynh
(74) *Attorney, Agent, or Firm* — Posz Law Group, PLC

(57) ABSTRACT

The construction machine includes a propulsion device, the working equipment, and a controller that controls the propulsion device. The controller performs attitude determination of determining whether or not the present attitude of the working equipment corresponds to a predetermined attitude, performs propulsion determination of determining whether or not the present propulsive operation of the propulsion device corresponds to a predetermined propulsive operation performed while performing a predetermined construction task that applies an over load to the working equipment, performs driving force determination of determining whether or not the magnitude of the present propelling force corresponds to a predetermined magnitude at which an over load is applied to the working equipment, and reduces the propelling force outputted from the propulsion device when the results of attitude determination, propulsion determination, and driving force determination are affirmative.

10 Claims, 9 Drawing Sheets

FIG. 5

| DRIVING FORCE VALUE (kgf) | CLUTCH PRESSURE TARGET VALUE (kg/cm2) |
|---|---|
| 40000 | 25 |
| 45000 | 25 |
| 46000 | 15 |
| 47000 | 11 |
| 48000 | 9.5 |
| 49000 | 8.5 |
| 50000 | 8 |
| 51000 | 7.5 |
| 52000 | 7 |
| 53000 | 6.5 |
| 54000 | 6 |
| 55000 | 5.5 |
| 56000 | 5 |
| 60000 | 5 |

CONSTRUCTION VEHICLE PROVIDED WITH WORK EQUIPMENT

CROSS REFERENCE TO RELATED APPLICATIONS

This application is a U.S. national stage application of PCT/JP2010/054079 filed on Mar. 11, 2010, and claims priority to, and incorporates by reference, Japanese Patent Application No. 2009-060094 filed on Mar. 12, 2009.

TECHNICAL FIELD

The present invention relates to a construction vehicle that is provided with a working equipment, and in particular relates to a control technique for preventing the application of an over load to the working equipment.

BACKGROUND ART

As one example of a construction vehicle, a wheel loader will be cited and explained. As shown in FIGS. 1(a) through 1(c), a wheel loader 100 comprises a main body 102 that has propulsion wheels 104, and a working equipment 106 that is attached to this main body 102. The working equipment 106 comprises a boom 108, a bucket 110, a boom cylinder (omitted from the figure), a bucket cylinder 112, and so on.

This wheel loader 100 performs an excavation task in which it loads broken store or earth and sand into the bucket 110, by pushing the bucket 110 forward into a heap of broken stone or earth and sand after blasting while driving the vehicle body forward. Moreover, when excavating a vertical wall such as a cliff face or the outer wall of a building, normally, as shown in FIGS. 1(a) through 1(c), the bucket 110 is pushed against the wall and digs into the wall due to a strong forward propelling force from the propulsion wheels 104.

A technique is known for preventing slippage of the propulsion wheels when performing this type of task, by detecting symptoms of slippage, and by adjusting the amount of engagement of a modulation clutch or adjusting the fuel injection amount of the engine (for example, refer to Patent Documents #1 and #2).

PRIOR ART DOCUMENTS

Patent Documents

Patent Document #1: Japanese Laid-Open Patent Publication 2001-146928;
Patent Document #2: Japanese Laid-Open Patent Publication 2005-146886.

SUMMARY OF THE INVENTION

Problems to be Solved by the Invention

When this wheel loader 100 is excavating a vertical wall as shown in FIGS. 1(a) through 1(c), a strong reaction force 122 that corresponds to the strong propelling force 120 from the propulsion wheels 104 acts from the vertical wall upon the bucket 110 in the direction to tilt the bucket 110 further (in other words, the direction tending to rotate the bucket 110 further upwards, i.e. the direction to pull out and extend the bucket cylinder 112). Due to the attitude of the working equipment 106 at this time, an undesirably strong pulling out and extending force is exerted upon the bucket cylinder 110 due to this reaction force 122, and sometimes it happens that an over load is exerted upon the bucket cylinder 110.

In other words, in many cases, during excavation of a vertical wall, the bucket 110 is held in its tilt end position (this is the position in which the bucket 110 cannot tilt any further, or, to put it in another manner, the bucket cylinder 112 cannot expand any further). As shown in FIG. 1(a), if the boom 108 is lowered and the bucket 110 is at a somewhat lower position, then the bucket 110 is in its tilt end position, and contacts against a bucket stopper 108A which is a portion of the boom 108. When excavating a vertical wall with the working equipment 106 which is in this low attitude, the strong reaction force 122 that is applied to the bucket 110 comes to be received by and shared between the bucket stopper 108a of the boom 108 and the bucket cylinder 112. Due to this, the pulling out force that is applied to the bucket cylinder 112 does not become excessively great.

By contrast if, as shown in FIG. 1(b) or FIG. 1(c), the boom 108 is raised somewhat further upwards so that the bucket 110 is at a somewhat higher position, and when, due to the structure of the working equipment 106, the bucket 110 is at its tilt end position, then, although the bucket cylinder 112 is extended to its maximum limit, still the bucket stopper 108A is separated from the bucket 110. When a vertical wall is excavated with the working equipment 106 in this type of attitude, then the strong reaction force 122 to which the bucket 110 is subjected from the vertical wall comes to be received by the bucket cylinder 112 alone. If the bucket cylinder 112 is not in its stroke end position, in other words if it is capable of both extension and retraction, then, even though the bucket cylinder is acted upon by this external force and the hydraulic pressure within the hydraulic circuit that includes its cylinder is raised, this force is released due to pressure relief. However, if the cylinder is at its stroke end position, then the external force directly influences the bucket cylinder, because it comes to be compressed due to its mechanical limit. Due to this, sometimes it is the case that an excessively great pulling out force comes to be imposed upon the bucket cylinder 112, and this is undesirable.

It is possible for problems resembling the one described above to occur, not only during excavation of a vertical wall by a wheel loader, but also in relation to construction vehicles of other types. In other words, a problem resembling the one described above occurs for any construction vehicle, when a working equipment thereof assumes some specific attitude within the range of variability of its attitude, if an excessively great reaction force from a subject that is being worked is imposed upon that working equipment on the basis of the strong propelling force of that construction vehicle.

Accordingly the object of the present invention is, with a construction vehicle, to prevent an over load from being imposed upon a working equipment due to a large reaction force from a subject of working being applied to the working equipment on the basis of the propelling force of the construction vehicle.

Means for Solving the Problems

The construction vehicle according to one embodiment of the present invention includes: a propulsion device that outputs propelling force; a working equipment, whose attitude is variable within a predetermined attitude range, and that is for performing a construction task upon a subject of working; and a controller that controls said propulsion device; wherein said controller: performs attitude determination in which it is determined whether or not the present attitude of said working equipment corresponds to a predetermined attitude within said attitude range; performs propulsion determination in which it is determined whether or not the present propulsive operation of said propulsion device corresponds to a predetermined propulsive operation that is performed when performing a predetermined construction task in which an over load is imposed upon said working equipment; performs driving force determination in which it is determined whether or not the magnitude of the present propelling force outputted from said propulsion device corresponds to a predetermined magnitude for which, if a reaction force based upon a larger propelling force is imposed from a subject of working upon said working equipment, an over load will be imposed upon said working equipment; and reduces the propelling force outputted from said propulsion device in the state in which the results of said attitude determination, said propulsion determination, and said driving force determination are all affirmative.

According to the structure described above, the controller is able to make a decision as to whether or not the operational state of the construction vehicle is a state in which an over load is being imposed upon the working equipment, and moreover, if it is a state in which an over load is imposed upon the working equipment, the controller is capable of alleviating the load upon the working equipment, since it performs control so as to decrease the propelling force upon which the reaction force is based.

With the working vehicle according to the present invention, the above described attitude determination, propulsion determination and driving force determination are performed, and, due to this, it is possible to detect with good accuracy the state in which an over load is being imposed upon the working equipment (for example, states such as those shown in FIGS. 1 (b) and 1 (c)). In this connection, with a simple method such as making this decision from only the pressure at the bottom of the boom cylinder, it is difficult to detect states such as those shown in FIGS. 1(b) and 1(c)). The reason for this is that, for the attitude of the working equipment 106 shown in FIG. 1(b), a force 126 due to the reaction force 122 acts upon the boom 108 in the direction to lower it, while by contrast, for the attitude of the working equipment 106 shown in FIG. 1(c), a force 128 due to the reaction force 122 acts upon the boom 108 in the direction to raise it. The behavior of the bottom pressure of the boom cylinder is different in the two cases, since, with the state of FIG. 1(b), the force acts to compress the boom cylinder, while, with the state of FIG. 1(c), the force acts to extend the boom cylinder.

In a preferred embodiment according to the present invention, said controller may further perform tilt determination in which it is determined whether or not the present tilt angle of said construction vehicle corresponds to a predetermined angle for which there is no possibility that said construction task is being performed by said working equipment, and may reduce the propelling force outputted from said propulsion device in the state in which the results of said attitude determination, said propulsion determination, and said driving force determination are all affirmative, and moreover the result of said tilt determination is negative.

In a preferred embodiment according to the present invention, said propulsion device may comprise a modulation clutch whose engagement amount can be variably adjusted, and is adapted to reduce said propelling force more, the more said engagement amount of said modulation clutch is decreased; and, when reducing said propelling force in the state in which the results of said attitude determination, said propulsion determination, and said driving force determination are all affirmative, said controller may determine a target engagement amount for said modulation clutch according to said present propelling force; and may reduce the engagement amount of said modulation clutch towards said target engagement amount.

In a preferred embodiment according to the present invention, said controller may determine said target engagement amount so that said target engagement amount becomes lower, the larger is said present propelling force.

In a preferred embodiment according to the present invention, if, while the results of said attitude determination, said propulsion determination, and said driving force determination are all affirmative, the result of any one of said attitude determination, said propulsion determination, and said driving force determination changes to negative, said controller may raise the engagement amount of said modulation clutch towards its original engagement amount before it was decreased.

In a preferred embodiment according to the present invention, the rate of decrease when said controller decreases the engagement amount of said modulation clutch may be made to be higher than the rate of increase when said controller increases the engagement amount of said modulation clutch.

In a preferred embodiment according to the present invention, said construction vehicle may be a wheel loader; said working equipment may comprise a boom, a bucket, and a bucket cylinder; said propulsion device may comprise a transmission; said predetermined attitude may be said bucket being in its tilt end position and moreover the height position of said bucket being higher than a predetermined height; and said predetermined propulsive operation may be the speed stage of said transmission being a predetermined low speed forward speed stage, and moreover the forward speed of said wheel loader due to said propulsion device being less than or equal to a predetermined low speed.

BRIEF DESCRIPTION OF THE DRAWINGS

FIG. 5 is a figure showing an example of a correspondence relationship between a driving force value and a clutch pressure target value;

DESCRIPTION OF THE EMBODIMENTS

In the following, embodiments of the present invention will be explained with reference to the drawings by citing examples in which the present invention is applied to a wheel loader, as a construction vehicle. However, these embodiments may also be applied to a construction vehicle other than a wheel loader.

Embodiment One

Figure 2:
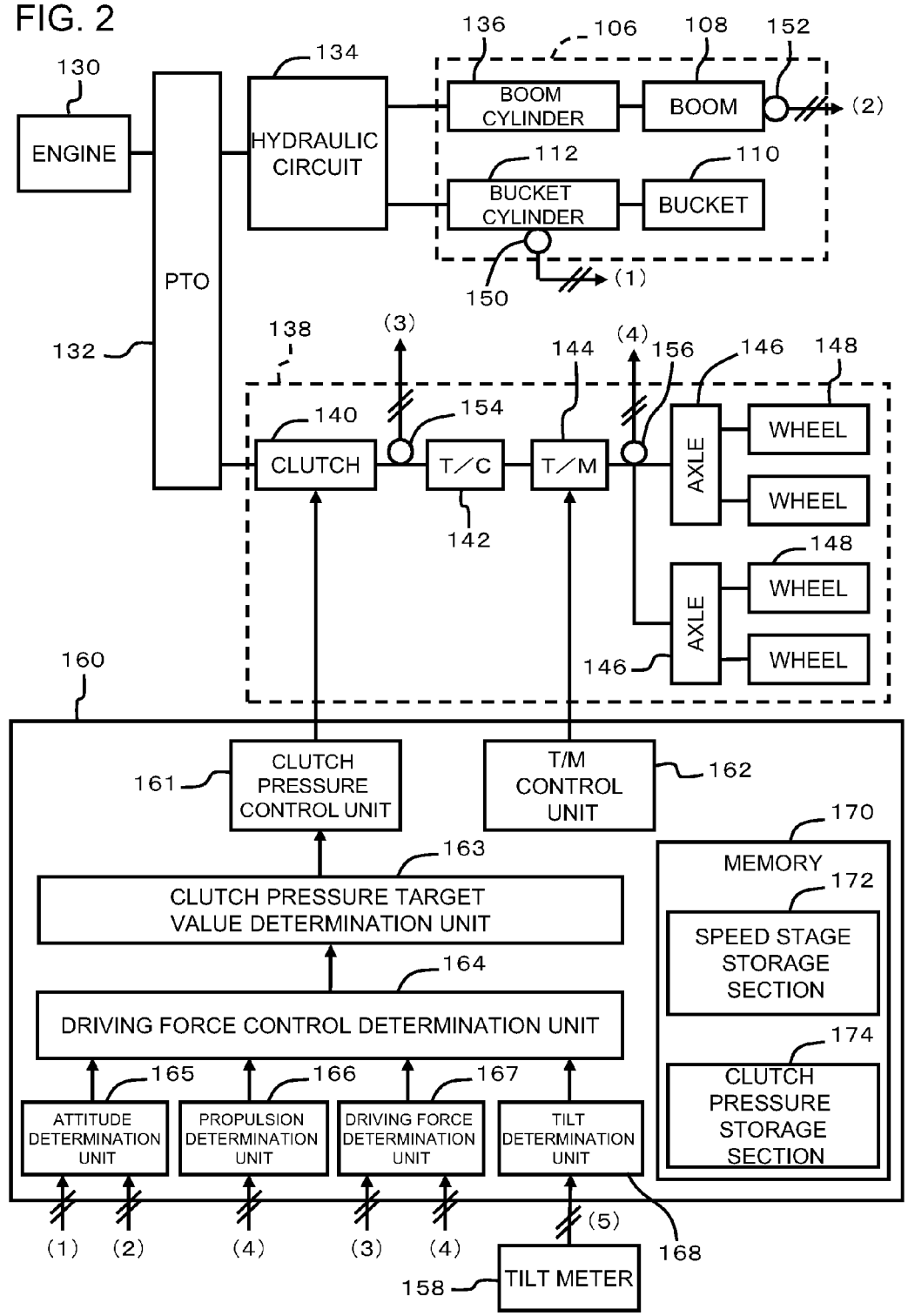
FIG. 2 is a block diagram schematically showing the overall structure of a wheel loader according to this embodiment.

FIG. 2 is a block diagram schematically showing the overall structure of a wheel loader 100 according to this embodiment.

This wheel loader 100, for example, comprises an engine 130, a propulsion device 138 for propelling the wheel loader, a working equipment 106, a hydraulic circuit 134 that is principally for driving the working equipment 106, and an output splitter (PTO: Power Take Off) 132 that divides the output of the engine 130 between the propulsion device 138 and the hydraulic circuit 134.

The propulsion device 138, for example, comprises a modulation clutch 140 (hereinafter simply termed a "clutch"), a torque converter (T/C) 142, a transmission (T/M) 144, axles 146, and wheels 148. The power outputted from the engine 130 is transmitted to the wheels 148 via the clutch 140, the torque converter 142, the transmission 144, and the axles 146. The clutch 140 according to this embodiment is not merely a clutch that is directly coupled (in which its amount of engagement is 100%) or disconnected (in which its amount of engagement is 0%), but is a clutch that also can provide slippage (in other words, it is a clutch whose degree of engagement can be adjusted to an intermediate value between 100% and 0%, thereby adjusting the amount of engine output that it transmits). The more the engagement amount of the clutch 140 is decreased, the more the maximum value of engine output torque transmitted to the transmission 144 is decreased, and due to this the propelling driving force (hereinafter simply termed the "driving force") outputted from [sic] the wheels 148 comes to be decreased, even though the engine output is the same. While there are a number of possible methods for controlling the engagement amount of the clutch 140, in this embodiment, the engagement amount of the clutch 140 is determined by a control hydraulic pressure that is applied to the clutch 140. In the following, the control hydraulic pressure that is applied to the clutch 140 will be termed the "clutch pressure".

The working equipment 106 comprises a boom 108, a bucket 110, a boom cylinder 136, a bucket cylinder 112, and so on. The hydraulic circuit 134 supplies working hydraulic fluid to the boom cylinder 136 and the bucket cylinder 112 using a hydraulic pressure pump not shown in the figures that is driven by the engine 130, and drives each of the boom 108 and the bucket 110 by extending and retracting these cylinders 136 and 112 respectively. And the boom 108 includes a bucket stopper 108A: this bucket stopper 108A serves the functions of stopping tilting of the bucket 110 past it, and of, during excavation of a wall or the like, receiving the reaction force 122 applied to the bucket 110 from the wall.

Figure 1:
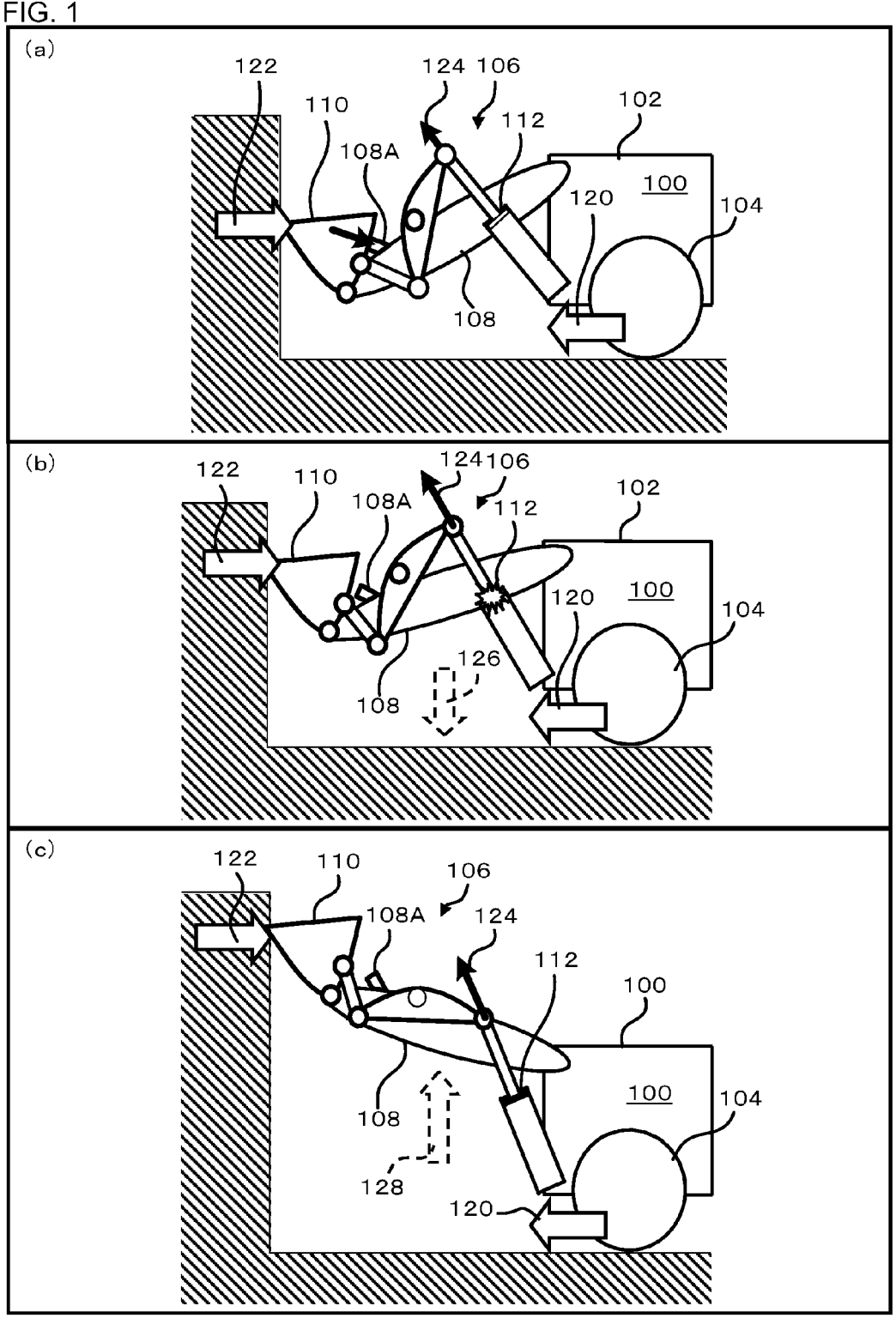
FIG. 1(a) is a schematic drawing of a wheel loader excavating a vertical wall, when the bucket is being held in a position somewhat lower than its height.
FIG. 1(b) is a schematic figure of the wheel loader excavating the vertical wall, when the bucket is being held in a position somewhat higher than its height.
FIG. 1(c) is a schematic figure of the wheel loader excavating the vertical wall, when the bucket is being held in a position yet higher than in FIG. 1(b)
Figure 3:
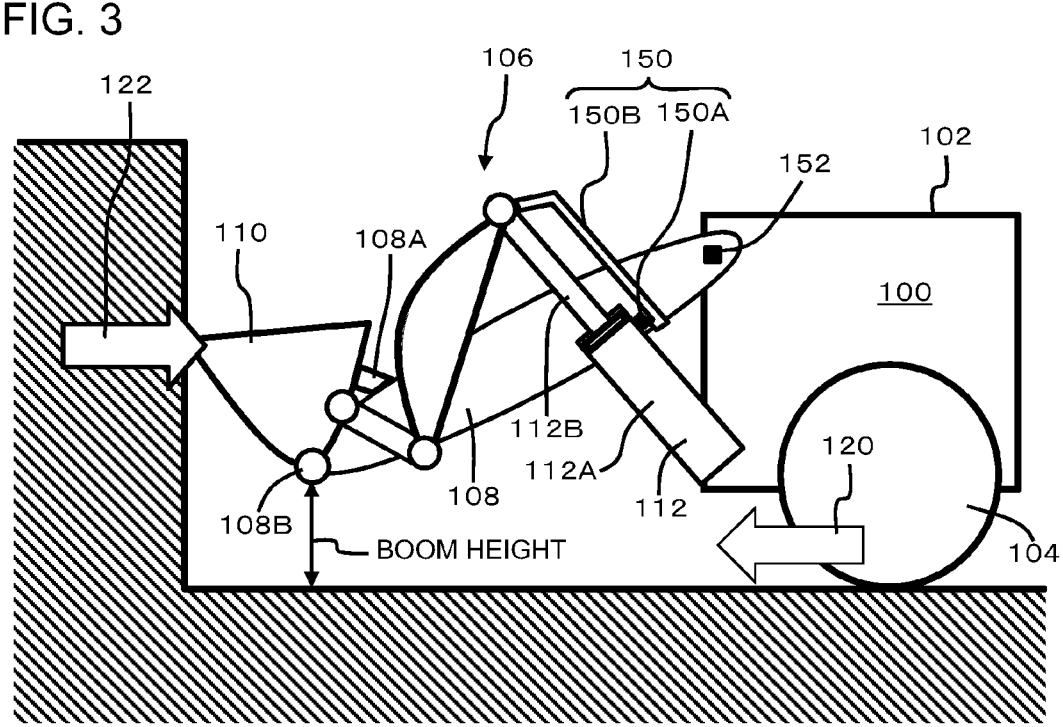
FIG. 3 is a side view of the wheel loader.

Now FIG. 3 will be referred to. FIG. 3 is a side view of the wheel loader 100. As shown in FIG. 3, a boom angle sensor 152 for detecting the angle of the boom 108 is provided at the point where the boom 108 and the main body 102 are linked together. Moreover, a stroke end sensor 150 is provided to the bucket cylinder 112 for detecting that the bucket cylinder 112 is in its stroke end state in which it cannot extend further. In this embodiment, this stroke end sensor 150 comprises a proximity switch 150 that is attached to the main body 112A of the bucket cylinder 112 and a movable bar 150B that is attached to the rod 112B of the bucket cylinder 112. It is arranged for this movable bar 150B to contact the proximity switch 150A and to turn it ON when the rod 112B of the bucket cylinder 112 is in its stroke end state in which it has been extended to the maximum limit. Accordingly, the proximity switch 150 goes to ON when the bucket cylinder 112 is in its stroke end state, and goes to off when the bucket cylinder 112 is in other states. When the height of the boom 108 and the bucket 110 is less than some predetermined height, as shown in FIG. 3 (or in FIG. 1(*a*)), and before the bucket cylinder 112 reaches its stroke end state, the bucket 110 comes into contact with the bucket stopper 108A, and at this point the bucket 110 arrives at its tilt end position (i.e. the position in which the bucket 110 cannot tilt any further). On the other hand, when the height of the boom 108 and the bucket 110 is greater than the predetermined height, as shown in FIG. 1(*b*) and FIG. 1(*c*), the position of the bucket 110 when the bucket cylinder 112 is in its stroke end state becomes the tilt end position of the bucket 110 just as it is. At this time the bucket 110 does not contact against the bucket stopper 108A. In this latter case, as already explained, during wall excavation or the like, sometimes it happens that an over load is imposed upon the bucket cylinder 112 due to the reaction force 112 from the wall. In this case, the signal from the stroke end sensor 150 (ON or OFF) indicates whether or not the bucket 110 is in its tilt end position. The signal outputted from the boom angle sensor 152 described above (that specifies a value corresponding to the angle of the boom 108) and the signal (ON or OFF) outputted from the stroke end sensor 150 are inputted to a controller 160 that will be described hereinafter.

Now we return to FIG. 2. A controller 160 that principally performs control of the clutch 140 and the transmission 144 is provided to this wheel loader 100. This controller 160 is built as an electronic circuit that includes, for example, a computer provided with a microprocessor and a memory 170. This control of the clutch 140 and the transmission 144 and so on is performed by the microprocessor of the controller 160 executing a predetermined program that is stored in the memory 160 of the controller 160.

This controller 160 comprises, for example, a clutch pressure control unit 161, a T/M control unit 162, a clutch pressure target value determination unit 163, a driving force control determination unit 164, an attitude determination unit 165, a propulsion determination unit 166, a driving force determination unit 167, and a tilt determination unit 168. And, for example, a speed stage storage section 172 and a clutch pressure storage section 174 are included in the memory 172 [sic].

The T/M control unit 162 is a processing unit that controls the changing over of the speed stages of the transmission 144 by transmitting a speed stage command signal to the transmission 144. For example, this T/M control unit 162 may store the present speed stage of the transmission 144 in the speed stage storage section 172.

The clutch pressure control unit 161 is a processing unit that controls the clutch pressure by transmitting a signal that commands a clutch pressure (hereinafter termed the "clutch pressure command signal") to the clutch 140, and thereby adjusts the engagement amount of the clutch 140. In the following, the clutch pressure that the clutch pressure control unit 161 commands by this clutch pressure command signal will be termed the "clutch pressure command value". The clutch pressure of the clutch 160 [sic] is controlled to this clutch pressure command value, and thereby its engagement amount becomes an engagement amount that corresponds to the clutch pressure command value.

The attitude determination unit 165 is a processing unit that determines whether or not the present attitude of the working equipment 106 corresponds to a predetermined attitude such as that shown in FIGS. 1(*b*) and 1(*c*). The propulsion determination unit 166 is a processing unit that determines whether or not the present propulsive operation of the propulsion device 138 corresponds to propulsive operation when performing a task (in this embodiment, an excavation task) that imposes an over load upon the working equipment 106. The driving force determination unit 167 is a processing unit that determines whether or not the magnitude of the present propelling force corresponds to a predetermined magnitude that imposes an excessively great lead upon the working equipment 106. The tilt determination unit 168 is a processing unit that determines whether or not the tilt angle around the fore and aft axis of the vehicle body corresponds to a predetermined range of angle for which there is a possibility that the task being performed (with this embodiment, the excavation task) will impose an over load upon the working equipment 106. The driving force determination unit 164 is a processing unit that makes a decision as to whether or not clutch control is to be performed, on the basis of the results of determination by each of the attitude determination unit 165, the propulsion determination unit 166, the driving force determination unit 167, and the tilt determination unit 168. And the clutch pressure target value determination unit 163 is a processing unit that determines a target value for the clutch pressure corresponding to the present driving force value.

As shown in FIG. 3, when the wheel loader 100 is performing an excavation task for a vertical wall or the like, the controller 160 according to this embodiment performs control so as to adjust the driving force 120 outputted from the propulsion device 138 to a magnitude at which no over load is imposed upon the working equipment 106, in order to prevent an over load from being imposed upon the working equipment 106 due to the reaction force 122 that corresponds to this driving force 120. In the following, this control will be termed "driving force control". In this driving force control, the controller 160 makes a decision as to whether or not the operational state of the wheel loader 100 is a state in which an over load is imposed upon the working equipment 106, and, if it is a state in which an over load is imposed upon the working equipment 106, performs adjustment of the driving force 120 by controlling the clutch pressure (i.e. by adjusting the engagement amount of the clutch 140). In the following, this control in which driving force control is performed and the driving force 120 is adjusted by adjusting the engagement amount of the clutch 140 will be termed "clutch control". The driving force control, and the details of the clutch control performed during driving force control, will be described hereinafter.

Referring to FIG. 2 again, a clutch output shaft rotational speed sensor 154 that detects the rotational speed of the output shaft of the clutch 140, a T/M output shaft rotational speed sensor 156 that detects the rotational speed of the output shaft of the transmission 144, and a tilt meter 158 that detects the tilt angle of the vehicle body around its fore and aft directional axis (in other words the pitch angle) are provided to this wheel loader 100. The signals outputted from the clutch output shaft rotational speed sensor 154, the T/M output shaft rotational speed sensor 156, and the tilt meter 158 are inputted to the controller 160, as shown by the arrow signs (3) through (5). In concrete terms, the signal that is outputted from the clutch output shaft rotational speed sensor 154 (i.e. the signal that specifies the rotational speed of the output shaft of the clutch 140) is inputted to the driving force determination unit 167 (FIG. 2 (3)). Moreover, the signal that is outputted from the T/M output shaft rotational speed sensor 156 (i.e. the signal that specifies the rotational speed of the output shaft of the transmission 144) is inputted to the propulsion determination unit 166 and to the driving force determination unit 167 (FIG. 2 (4)). Furthermore, the signal that is outputted from the tilt meter 158 (i.e. the signal that specifies the tilt angle of the vehicle body around its fore and aft directional axis) is inputted to the tilt determination unit 168. And as described above, as shown by the arrows (1) and (2), the signal from the boom angle sensor 152 and the signal (ON or OFF) from the stroke end sensor 150 are also inputted to the controller 160 (in concrete terms, to the attitude determination unit 165). The controller 160 performs driving force control on the basis of these sensor signals ((1) through (5)). In the following, the details of the driving force control according to these embodiments will be explained in concrete terms.

Figure 4:
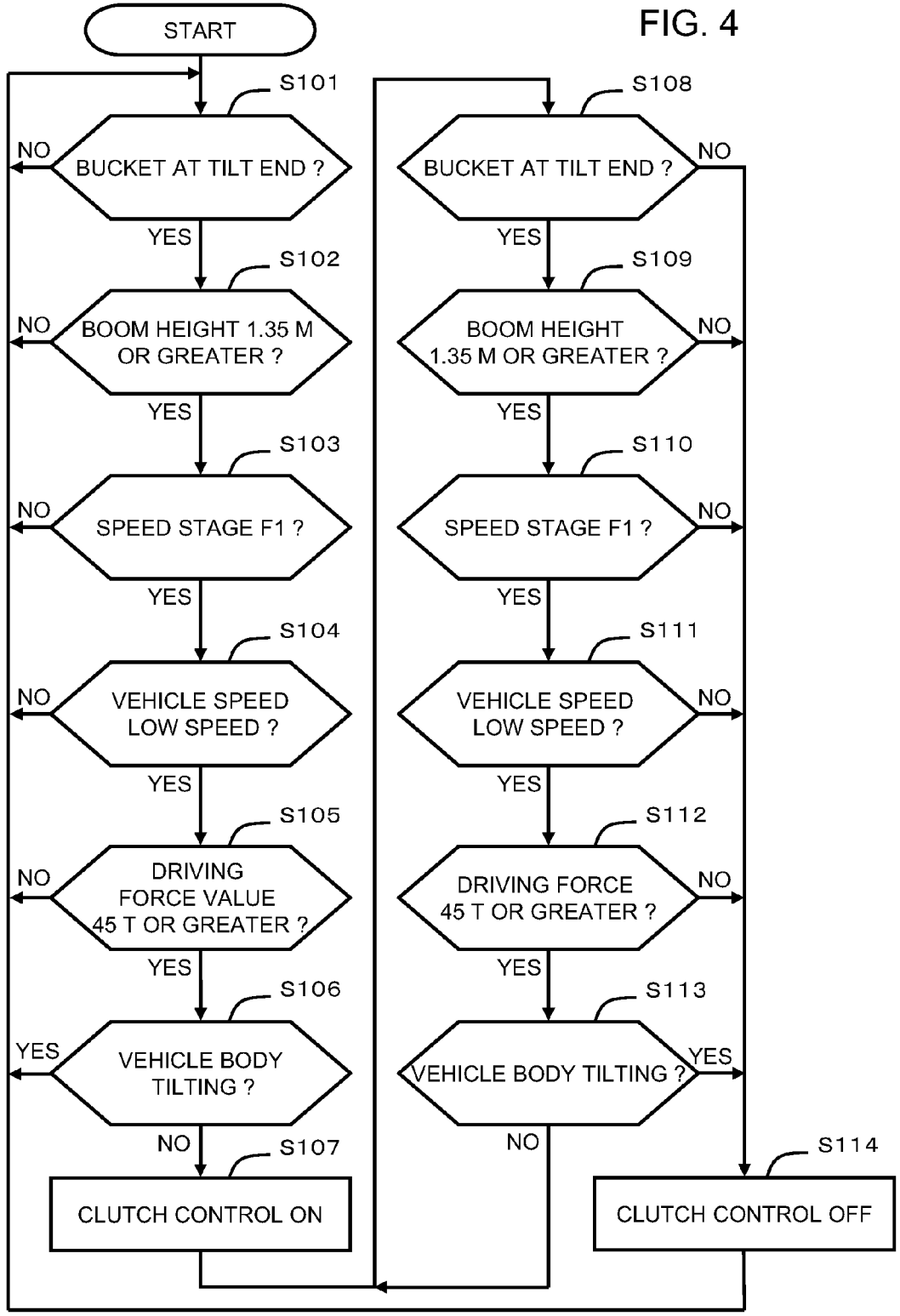
FIG. 4 is a flow chart showing the details of driving force control according to this embodiment.

FIG. 4 is a flow chart showing the details of the driving force control according to this embodiment.

First, in a step S101, the attitude determination unit 165 makes a decision as to whether or not the bucket 110 is in the tilt end position (precisely, while it is decided whether or not the bucket cylinder 112 is in the stroke end state, since the tilt end position corresponds to the stroke end state in a case such as that shown in FIGS. 1(b) and 1(c) that is considered as being the problem for the present invention, accordingly, in this control, both of these are not precisely determined but are treated being equivalent). In concrete terms, for example, the attitude determination unit 165 is able to make a decision as to whether or not the bucket 110 is in the tilt end position on the basis of the signal received from the stroke end sensor 150 ((1) in FIG. 2) (ON or OFF). In other words, if the signal from the stroke end sensor 150 is in the ON state, then the attitude determination unit 165 is able to determine that the bucket 110 is at the tilt end position (the stroke end state), while, if the signal from the stroke end sensor 150 is in the OFF state, then it is able to determine that the bucket 110 is not at the tilt end position (the stroke end state). As a variant example, it would also be acceptable to arrange to provide another signal, for example an angle sensor, to a coupling unit 108B for the bucket 110 and the boom 108, to detect the angle of the bucket 110 with respect to the boom 108, and to determine the tilt end position (the stroke end state) on the basis of the angle that has been detected and the height of the boom 108. In the case of this variant embodiment, it is possible to determine in one operation whether or not the system is in a "predetermined attitude" that will be described hereinafter.

If the bucket 110 is not in the tilt end position (NO in the step S101), then the driving force control determination unit 164 decides not to perform clutch control (i.e. control in which the engagement of the clutch 140 is adjusted so that the driving force is adjusted). In other words, if the bucket 110 is not in the tilt end position (or the stroke end state), then, as shown in FIGS. 1(b) and 1(c), the working equipment 106 does not assume an attitude such that the bucket cylinder 112 is in its stroke end state and an over load is imposed upon the bucket cylinder 112 due to it only receiving a large reaction force 122 (in this specification, this type of attitude of the working equipment 106 is termed a "predetermined attitude"). Accordingly clutch control is not performed in this case, and the processing of the step S101 is performed again after having waited for a fixed time period.

On the other hand, if the bucket 110 is in the tilt end position (YES in the step S101), then the attitude determination unit 165 makes a decision as to whether or not the present height of the boom 108 is greater than or equal to a predetermined threshold height value for deciding whether or not it is in the above described "predetermined attitude", for example 1.35 [m] (a step S102). In this embodiment, as shown in FIG. 3, the height above the ground of the point where the boom 108 and the bucket 110 are connected together is defined as being the height of the boom 108. The attitude determination unit 165 is able to calculate the height of the boom 108 on the basis of the present angle of the boom 108 as detected by the boom angle sensor 152. The height threshold value of 1.35 [m] described above is the boundary value for the height of the boom 108 that separates between whether or not the bucket 110 comes into contact with the bucket stopper 108A, when the bucket 110 is in its tilt end position. In other words, if the height of the boom 108 is lower than 1.35 [m], then in its tilt end position the bucket 110 contacts against the bucket stopper 108A, while if the height of the boom 108 is 1.35 [m] or greater, then in its tilt end position the bucket 110 does not contact against the bucket stopper 108A.

If the result of the decision in the step S102 is that the present height of the boom 108 is lower than the height threshold value (1.35 [m]) (in other words, if the bucket 110 is in its tilt end position (the decision completed in the step S101) and moreover is contacted against the bucket stopper 108A (NO in the step S102)), then the driving force control determination unit 164 decides that clutch control is not to be performed. In other words, in this case, the strong reaction force 122 that is applied to the bucket 110 comes to be received by being apportioned between the bucket stopper 108A and the bucket cylinder 112, and no excessively great pulling out force comes to be applied to the bucket cylinder 112. In other words, the working equipment 106 is not in such a predetermined attitude as shown in FIGS. 1(*b*) and 1(*c*). Accordingly, in this case as well, clutch control is not performed, and the processing of the step S101 is performed again after having waited for a fixed time period.

On the other hand, if the result of the decision in the step S102 is that the present height of the boom 108 is greater than or equal to the height threshold value (1.35 [m]) (in other words, if the bucket 110 is in its tilt end position and moreover is not contacted against the bucket stopper 108A) (YES in the step S102), then this means that the working equipment 106 is in the predetermined attitude such as shown in FIGS. 1(*b*) and 1(*c*). In this case, the propulsion determination unit 166 makes a decision as to whether or not the present speed stage of the transmission 144 is F1 (the first forward speed) (a step S103). As described above, the T/M control unit 162 controls the speed stage of the transmission 144, and the present speed stage of the transmission 144 is stored in the speed stage storage section 172. Accordingly, the propulsion determination unit 166 is able to make the decision as to whether or not the present speed stage is F1 by referring to the speed stage of the transmission 144 that is stored in the speed stage storage section 172. As a variant example, it would also be acceptable to decide whether or not the present speed stage is F1 on the basis of some other signal such as, for example, a speed stage selection signal from a shift operation device (typically a gear lever) that is next to the seat of the driver, or by detecting the actual gear state of the transmission 144.

If the present speed stage of the transmission 144 is not F1 (NO in the step S103), then the driving force control determination unit 164 decides that clutch control is not to be performed. In other words, the situation in which a large forward driving force can be outputted is when the speed stage is F1, and generally the speed stage that is selected when performing an excavation task is F1. Accordingly, if the speed stage is not F1, then the possibility is high that an excavation task is not being performed. Moreover, the driving force when the speed stage is other than F1 is not sufficiently great to impose an over load upon the working equipment 106. Accordingly, in the case that the speed stage is not F1 as well, clutch control is not performed, and the processing of the step S101 is performed again after having waited for a fixed time period.

On the other hand, if the present speed stage of the transmission 144 is F1 (YES in the step S103), then the propulsion determination unit 166 makes a decision as to whether or no the forward running speed of the wheel loader 100 is within the low speed range such as normally used during an excavation task (i.e. is a range in the neighborhood of 0 [km/h]) (hereinafter simply termed "low speed") (a step S104). In concrete terms, for example, the propulsion determination unit 166 may decide that the running speed is a low speed if the running speed as calculated on the basis of the rotational speed of the output shaft of the transmission 144 as detected by the T/M output shaft rotational speed sensor 156 is less than or equal to a predetermined threshold speed value (for example 1 [km/h]).

If the running speed is not low speed (NO in the step S104), then the driving force control determination unit 164 decides that clutch control is not to be performed. In other words, since the running speed is almost 0 [km/h] when an excavation task is being performed, accordingly, if the running speed is not low speed, then it may be determined that an excavation task is not being performed (in other words, that the working equipment is not experiencing any large force). Accordingly clutch control is also not performed if the running speed is not low speed, and the processing of the step S101 is performed again after having waited for a fixed time period.

On the other hand, if the running speed is low speed (YES in the step S104), then the driving force determination unit 167 makes a decision as to whether or not the value of the driving force 120 (i.e. the driving force value) is greater than or equal to a predetermined driving force threshold value, for example 45000 [kgf] (a step S105). This driving force threshold value of 45000 [kgf] is a boundary value for the driving force value that divides between whether or not any possibility arises that an over load will be imposed upon the working equipment 106 in the predetermined attitude due to a reaction force 122 corresponding to this driving force 120. In other words, if the driving force value is less than 45000 [kgf], then there is no possibility that any over load will be imposed upon the working equipment 106 even if the working equipment 106 is in the predetermined attitude, while, if the driving force value is greater than or equal to 45000 [kgf], then there is a possibility that an over load will be imposed upon the working equipment 106 in the predetermined attitude. It would also be acceptable to change the driving force threshold value according to the predetermined attitude of the working equipment, in other words according to the height of the boom 108.

Now, the procedure for calculating the driving force value will be explained in a simple manner. This calculation of the driving force value is performed by the driving force determination unit 167. First, the driving force determination unit 167 calculates the speed ratio on the basis of the rotational speed of the output shaft of the clutch 140 as detected by the clutch output shaft rotational speed sensor 154 (which is equivalent to the rotational speed of the input shaft of the torque converter 142) and the rotational speed of the output shaft of the transmission 144 as detected by the T/M output shaft rotational speed sensor 156. (The rotational speed of the input shaft of the transmission 144 is obtained using the current deceleration ratio of the transmission 144 to the rotational speed of the output shaft of the transmission 144. The rotational speed of the input shaft of the transmission 144 is equivalent to the rotational speed of the output shaft of the torque converter 142.) Next, the driving force determination unit 167 acquires a primary torque coefficient that corresponds to the speed ratio calculated as described above by referring to a predetermined map. And next, the driving force determination unit 167 calculates the input torque to the torque converter 142 on the basis of the rotational speed of the output shaft of the clutch 140 (i.e. the rotational speed of the input shaft of the torque converter 142) that has been detected as described above and the primary torque coefficient that has been acquired as described above. And the driving force determination unit 167 calculates a driving force value from the input torque of the torque converter 142 that has been described as described above, while taking into consideration the efficiency for torque transmission, the deceleration ratio of the transmission 144, the deceleration ratio of the axles 146, and the effective radius of the wheels (tires) 148. Of course, it would also be acceptable to arrange to detect or to calculate the driving force value by some other method. Or, as a variant example, as a value that is equivalent to the driving force value, it would also be acceptable to arrange to detect or to calculate the value of the reaction force 122 that is applied to the working equipment 106, or the value of the pulling out force to which the bucket cylinder 112 is subjected.

If the driving force value is smaller than the driving force threshold value of 45000 [kgf] (NO in the step S105), then the driving force control determination unit 164 decides that clutch control is not to be performed. In other words, since if the driving force value is smaller than 45000 [kgf] then there is no fear than any over load will be imposed upon the working equipment 10 [sic] due to the reaction force that corresponds to this driving force, accordingly clutch control is not performed, and the processing of the step S101 is performed again after having waited for a fixed time period.

On the other hand, if the driving force value is greater than or equal to the driving force threshold value of 45000 [kgf] (YES in the step S105), then the tilt determination unit 168 makes a decision as to whether or not the tilt angle of the vehicle body around the direction of its fore and aft axis as detected by the tilt meter 158 corresponds to a predetermined angular range for which there is no possibility that an excavation task is being performed (for example, its angle of dip or angle of elevation is 4° or more; in the following, this will be termed the "angle at which working cannot be performed") (a step S106). For example, when the angle of dip or the angle of elevation of the vehicle body is 4° or more, then it is considered that the wheel loader 100 is in a state upon a steeply descending slope or a steeply ascending slope, and in this type of state it is considered that the possibility that an excavation task is being performed is extremely low. As a variant example, it would also be acceptable to arrange only to detect when the angle of elevation of the vehicle body is greater than or equal to a predetermined angle as being an angle at which working cannot be performed, without taking the angle of dip into consideration. This is because with a steeply ascending slope sometimes it may happen that, due to the weight of the vehicle, the value of the driving force may exceed the above described threshold value driving force of 45000 [kgf], even though there is no fear that any over load will be imposed upon the working equipment 106.

If the tilt angle of the vehicle body corresponds to an angle at which working is not possible (YES in the step S106), then the driving force control determination unit 164 decides that clutch control is not to be performed. In other words since, in this case, there is no possibility of performing an excavation task, and since thus there is no possibility that any over load will be imposed upon the working equipment 106, accordingly clutch control is not performed, and the processing of the step S101 is performed again after having waited for a fixed time period.

On the other hand, if the tilt angle of the vehicle body corresponds to an angle at which working cannot be performed (NO in the step S106), then the driving force control determination unit 164 decides that clutch control is to be performed, and clutch control is started (a step S107). The details of this clutch control will be explained hereinafter with reference to FIGS. 5 and 6.

In this manner, with this embodiment, when all of the six conditions for which decisions are made in the steps S101 through S106 hold (in other words, (1) that the bucket 110 is in the tilt end position, (2) that the height of the boom is greater than or equal to 1.35 [m], (3) that the speed sage is F1, (4) that the vehicle speed is low speed, (5) that the driving force is greater than or equal to 45000 [kgf], and (6) that the tilt angle of the vehicle body does not correspond to an angle at which working cannot be performed), then it is decided that the operational state of the wheel loader 100 is a state in which an over load is being imposed upon the working equipment 106, and clutch control is started. In the following, each of these six conditions will be termed a "clutch control start condition". It should be understood that it is not necessary for the clutch control start conditions necessarily to be the six conditions described above; they need merely be conditions in which it is possible to decide that the operational state of the wheel loader 100 is a state in which an over load is being imposed upon the working equipment 106. Moreover, it would also be acceptable for only a portion of the above described six conditions to be taken into consideration as the clutch control start conditions. For example, it would also be acceptable for clutch control to be started when all of the conditions (1) through (5) hold, without taking into consideration the condition (6) (i.e. without employing the condition (6) as a clutch control start condition).

Cancellation of the clutch control is performed when any one of the clutch control start conditions has become invalid. In other words, in this embodiment, if even one among the conditions (1) through (6) has ceased to hold, then clutch control is cancelled. In concrete terms, as shown in FIG. 4, in the state in which clutch control is being performed, similar decisions are taken (in steps S108 through S113) to those of the steps S101 through S106. And if, in any of these decisions of the steps S108 through S113, the decision result is obtained that some clutch control start condition does not hold, then the clutch control is cancelled (a step S114).

In the following, the details of this clutch control will be explained in concrete terms.

In this clutch control, a target value for the engagement amount of the clutch 140 (hereinafter termed the "target engagement amount") is determined according to the present driving force value, and the engagement amount of the clutch 140 is controlled so as to become that target engagement amount (or so as to approach that target engagement amount). In concrete terms, the clutch pressure target value determination unit 163 determines a target value for clutch pressure that corresponds to the present value of the driving force (hereinafter termed the "clutch pressure target value"), and the clutch pressure control unit 161 controls the clutch 140 on the basis of this clutch pressure target value that has thus been determined so that the clutch pressure becomes equal to the clutch pressure target value (or so that it becomes a value that is closer to the clutch pressure target value than the present clutch pressure). For example, for each of various values of the driving force, the clutch pressure target value determination unit 163 may determine in advance and store a clutch pressure target value that corresponds to that driving force value, and may determine the clutch pressure target value corresponding to the present clutch pressure on the basis of a correspondence relationship between these driving force values and clutch pressure target values.

Figure 6:
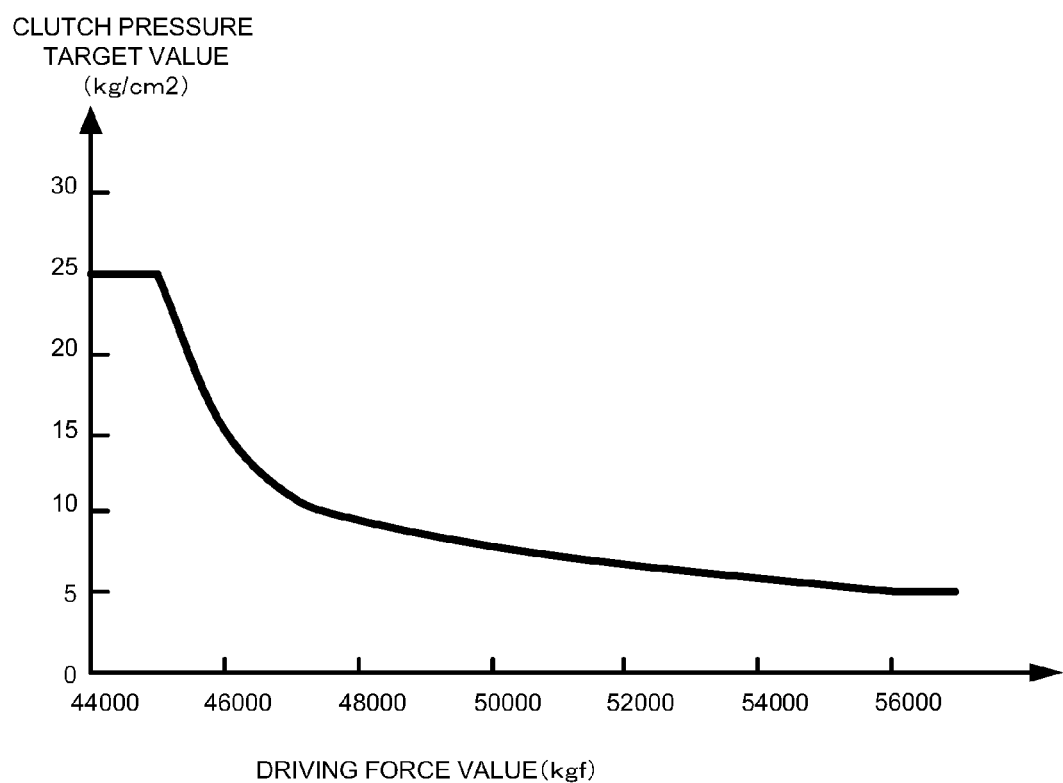
FIG. 6 shows the correspondence relationship of FIG. 5 in graphical form.

FIG. 5 is a figure showing an example of a correspondence relationship between the driving force value and the clutch pressure target value. And FIG. 6 is a figure showing the correspondence relationship of FIG. 5 made into the form of a graph. As shown in FIG. 5 or FIG. 6, in this embodiment, the maximum value of the clutch pressure is 25 [kg/cm$^2$]. If the clutch pressure is at its maximum (in other words, 25 kg/cm$^2$), then the clutch 140 is in its directly coupled state (in which its engagement amount is 100%).

As shown in FIG. 5, the higher the driving force value is, the lower does the clutch pressure target value become. In other words, control is performed so that, the higher the present driving force value is, the lower does the clutch pressure become (in other words, so that the engagement amount becomes lower), so that the driving force 120 is reduced.

Figure 7:
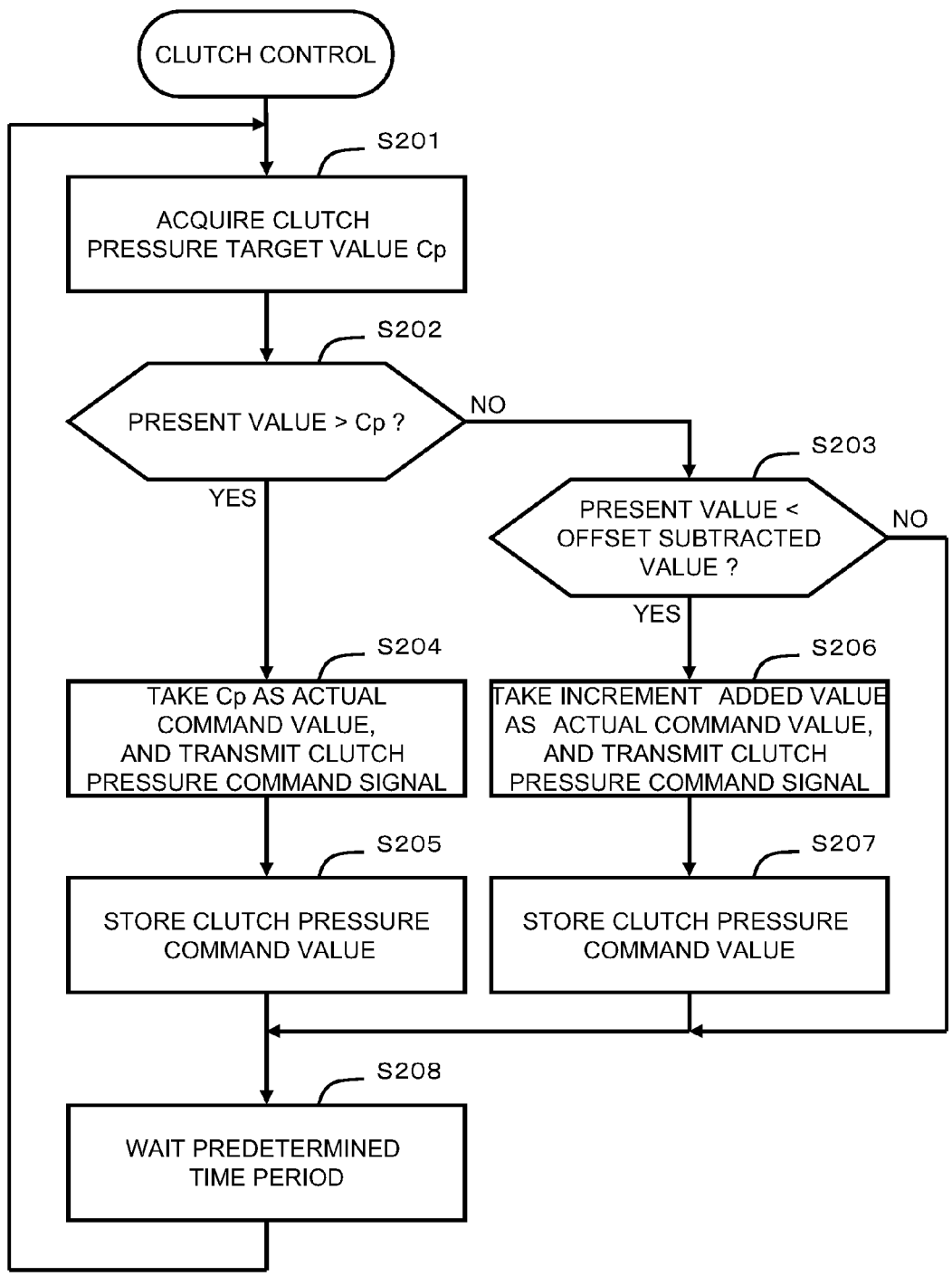
FIG. 7 is a flow chart showing the details of clutch control according to this embodiment.

FIG. 7 is a flowchart showing the details of the clutch control according to this embodiment.

First, as shown in FIG. 5, the clutch pressure target value determination unit 163 refers to the correspondence relationship between the driving force values and the clutch pressure target values, and acquires the clutch pressure target value that corresponds to the present driving force value (a step S201). For example, if the present driving force value is 48000 [kgf], then the clutch pressure target value is 9.5 [kg/cm$^2$]. It should be understood that the procedure for calculating the driving force value is as explained in connection with the step S105 of FIG. 4.

Next, the clutch pressure control unit 161 makes a decision as to whether or not the present clutch pressure command value (the clutch pressure that was commanded by the clutch pressure control unit 161 with the clutch pressure command signal (i.e. the signal that commands the clutch pressure)) is greater than the clutch pressure target value that was acquired in the step S201 (a step S202). Here, the present clutch pressure command value means the clutch pressure command value that is being currently commanded for the clutch 140, in other words the clutch pressure command value that was commanded by the clutch pressure command signal transmitted in the previous control cycle. While this will be described hereinafter, when transmitting the clutch pressure command signal, the clutch pressure control unit 161 stores the clutch pressure command value commanded by this clutch pressure command signal in the clutch pressure storage section 174. Accordingly, the clutch pressure control unit 161 is able to refer to the clutch pressure command value that is stored in the clutch pressure storage section 174 as being the present clutch pressure command value. It should be understood that, directly after the start of clutch control when no clutch pressure command signal has yet been transmitted even once, no such present clutch pressure command value is stored in the clutch pressure storage section 174. In this case, the clutch pressure control unit 161 may, for example, take the clutch pressure when the clutch 140 is in the directly coupled state (in which its engagement amount is 100%) (in other words, 25 [kg/cm$^2$]) as being the present clutch pressure command value.

If the present clutch pressure command value is greater than the clutch pressure target value (YES in the step S202), then the clutch pressure control unit 161 takes the clutch pressure target value as a clutch pressure command value that is actually commanded (hereinafter termed the "actual command value"), and transmits a clutch pressure command signal that commands this actual command value to the clutch 140 (a step S204). Due to this, the clutch pressure is controlled to the actual command value (i.e. to the clutch pressure target value), and the engagement amount of the clutch 140 becomes equal to the engagement amount corresponding to the actual command value (i.e. to the clutch pressure target value). In this manner, if the present clutch pressure command value is greater than the clutch pressure target value, the clutch pressure target value is directly taken as being the actual command value, and the clutch pressure is controlled so as to become equal to the clutch pressure target value. In other words, the clutch pressure control unit 161 controls the clutch 140 so that the clutch pressure is at once decreased towards the clutch pressure target value. As a result, the fear that an over load may be imposed upon the working equipment 106 is reduced, since the driving force 120 that is actually being outputted is forcibly suppressed.

Thereafter, the clutch pressure control unit 161 stores the clutch pressure command value in the clutch pressure command signal that was transmitted in the step S204 (in other words, the clutch pressure target value) in the clutch pressure storage section 174 (a step S205).

On the other hand, if the present clutch pressure command value is less than or equal to the clutch pressure target value (NO in the step S202), then the clutch pressure control unit 161 makes a decision as to whether or not the present clutch pressure command value is smaller than the value obtained by subtracting just a predetermined offset value from the clutch pressure target value (hereinafter termed the "offset subtracted value") (a step S203).

If the present clutch pressure command value is less than the offset subtracted value (YES in the step S203), then the clutch pressure control unit 161 takes a value (hereinafter termed the "increment added value") obtained by adding a predetermined increment (hereinafter termed the "first increment") to the present clutch pressure command value as being the actual command value, and transmits a clutch pressure command signal that commands this actual command value to the clutch 140 (a step S206). Due to this, the clutch pressure is controlled to the actual command value (i.e. the increment added value), and the engagement amount of the clutch 140 becomes equal to an engagement amount that corresponds to this actual command value (i.e. to the increment added value). Here, the first increment is the width over which the clutch pressure (i.e. the engagement amount) is raised when elevated, and is set to a comparatively small value. In concrete terms, in this embodiment, as shown in FIG. 5, the clutch pressure target value is a value in the range of 5 [kg/cm$^2$] to 25 [kg/cm$^2$] graduated in steps of 0.5 [kg/cm$^2$]. For example, the first increment may be set to a value that is smaller than this graduation step width (0.5 [kg/cm$^2$]), for example to 0.2 [kg/cm$^2$]. By setting the first increment to a comparatively small value in this manner, the clutch pressure is controlled so that it becomes greater by a comparatively small increase width from the present clutch pressure. In other words, the clutch pressure control unit 161 controls the clutch 140 so as gently to elevate the clutch pressure (i.e. its engagement amount) towards the clutch pressure target value.

Thereafter, the clutch pressure control unit 161 stores the clutch pressure command value in the clutch pressure command signal that was transmitted in the step S206 (in other words, the increment added value) in the clutch pressure storage section 174 (a step S207).

On the other hand, if the present clutch pressure command value is greater than or equal to the offset subtracted value (NO in the step S203), then no clutch pressure command signal is transmitted. In other words, if the present clutch pressure command value is within the range from the offset subtracted value to the clutch pressure target value, then the clutch pressure control unit 161 maintains the present clutch pressure without changing the clutch pressure. The reason for this neutral zone, which is a range (i.e. the range from the offset subtracted value to the clutch pressure target value) in which the clutch pressure is not changed, being set in this manner is in order to prevent the occurrence of the problem of the operation becoming unstable due to elevation and decrease of the clutch pressure being alternately repeated when the present clutch pressure command value is a value in the vicinity of the clutch pressure target value (i.e. the so called chattering problem). And the reason for this neutral zone being provided in a region that is lower than the clutch pressure target value is in order to be in accord with the control objective of the clutch control according to this embodiment, which is, when the clutch pressure is to be decreased, to decrease it immediately with good responsiveness, while, when the clutch pressure is to be elevated, to elevate it gently.

Thereafter the clutch pressure target value determination unit 163 performs the processing of the step S201 again, after having waited for a predetermined time period (for example 10 [ms]). In other words, the processing of the steps S201 through S208 is repeatedly performed at predetermined time intervals.

It should be understood that, when the clutch control has been cancelled, the clutch pressure control unit 161 performs control to elevate the clutch pressure, in order to return the clutch 140 to the directly coupled state (in other words to the state in which the clutch pressure is 25 [kg/cm$^2$]). In concrete terms, for example, every 10 [ms] until the clutch pressure becomes 25 [kg/cm$^2$], the clutch pressure control unit 161 repeatedly transmits to the clutch 140 clutch pressure command signals commanding, as clutch pressure values, values that are obtained by adding a predetermined increment (hereinafter termed the "second increment") to the present clutch pressure command values. Here, this second increment may, for example, be a value that is larger than the first increment (0.2 [kg/cm$^2$]), (for example 0.5 [kg/cm$^2$]). In other words, elevation of the clutch pressure is performed at a larger increase width than the width at which the pressure is increased while clutch control is being executed.

Embodiment Two

Second embodiments will now be explained with reference to FIGS. 8 and 9. In these embodiments, cases will be explained in which the driving force control of the present invention is applied to wheel loaders that use electric motors 181.

In this embodiment, instead of the clutch control discussed with reference to the first embodiment, it is also possible, for example, to arrange to control just the output of the electric motor 181. Due to this, it is possible to reduce the propelling force, and thus to prevent any over load from being imposed upon the working equipment 106 before it even happens. Or it would also be possible to implement an appropriate combination of some other type of control, such as control of the speed stage of the transmission 144 to neutral or control of the braking amount, with control of the output of the electric motor. Any of clutch control, control of the output of the electric motor, control of the speed stage of the transmission, and brake control, or a combination thereof, may correspond to the "adjustment device" of the Claims.

Figure 8:
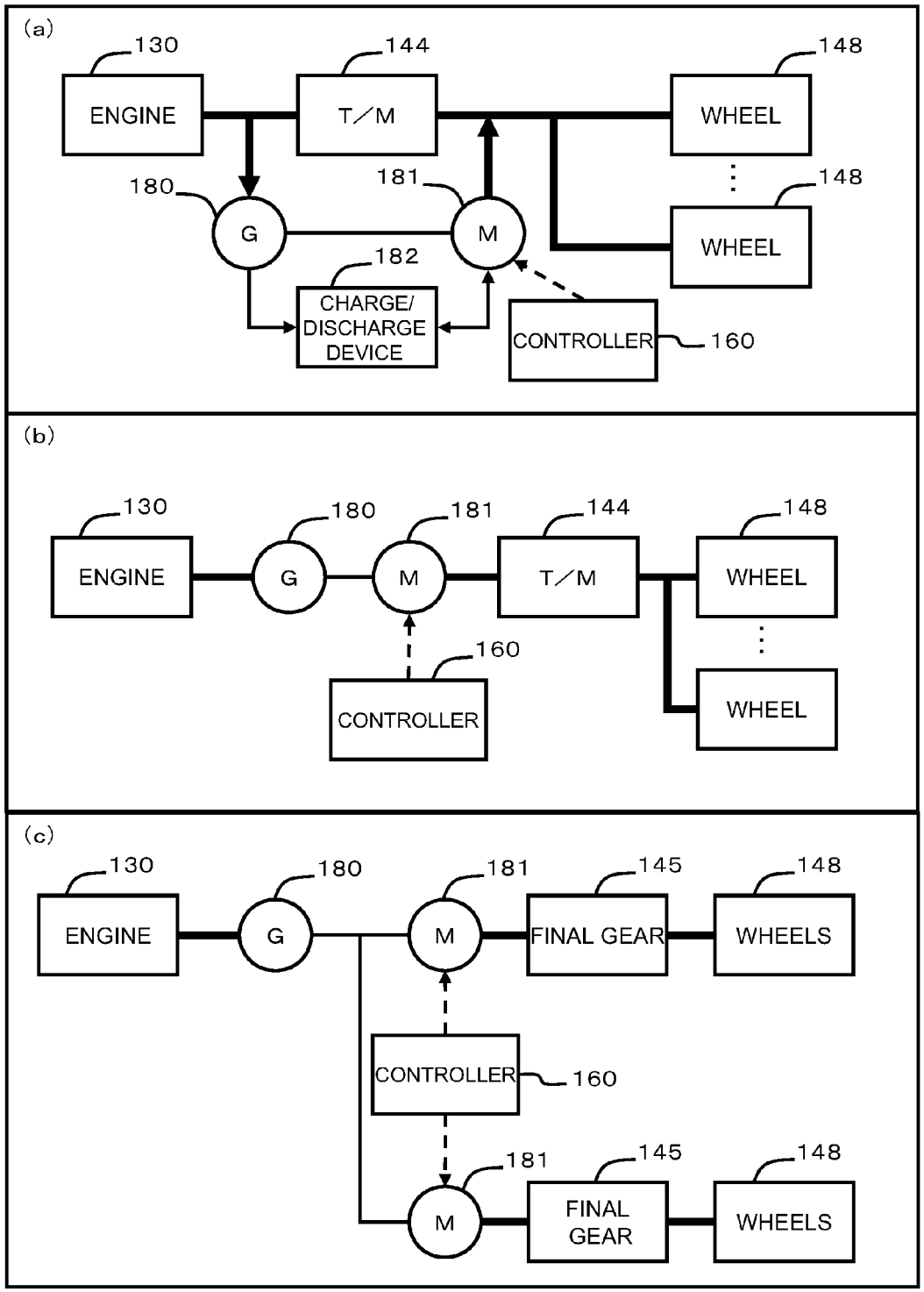
FIG. 8 is a schematic figure showing construction vehicles that are propelled by the use of electric motors.

FIG. 8 schematically shows the principal portions of the structures of the propelling systems of wheel loaders that employ electric motors 181. It should be understood that, for convenience, the clutch and the battery and so on are omitted from the structures shown in FIGS. 8(b) and 8(c). The surplus of the electrical energy outputted from a generator 180 is accumulated in a charge/discharge device such as a battery or the like, and the back electromotive force of the electric motor 181 during deceleration is also accumulated in the charge/discharge device 182. The charge/discharge device 182 is not limited to being a battery; it could also be a capacitor or the like.

With the type shown in FIG. 8(a), the generator 180 is driven by the output of the engine 130, and the electric motor 181 is rotated by the electrical energy that it generates. The rotational power of the electric motor 181 is added to the rotational power outputted from the transmission 144.

For example, a structure may be considered in which, of the rotational power that operates upon the wheels 148, around 80% is covered by the output of the engine, and the remaining 20% is covered by the electric motor 181. The controller 160 is able to control the rotational power of the electric motor 181 so as no to impose any excessively great lead upon the working equipment 106.

With the type shown in FIG. 8(b), the wheels 148 are rotated only by the rotational power of the electric motor 181. The generator 180 is driven by the engine output. The electric motor 181 converts the electrical energy supplied from the generator 180 into rotational power, and transmits this power to each of the wheels 148 via the transmission 148. And the controller 160 controls the rotational power of the electric motor 181 so that no over load is imposed upon the working equipment 106.

With the type shown in FIG. 8(c), an individual electric motor 181 are provided to each of the plurality of wheels 148 that is a drive wheel. In the case of rear wheel drive each of the wheels 148 that is a rear wheel is provided with an electric motor 181, while in the case of front wheel drive each of the wheels 148 that is a front wheel is provided with an electric motor 181. And in the case of four wheel drive all of the wheels 148 are provided with electric motors 181.

The rotational power of the electric motors 181 is transmitted to each of the wheels 148 via final gears 145. The controller 160 controls the rotational power of each of the electric motors 181 individually, so as not to impose any over load upon the working equipment 106.

Figure 9:
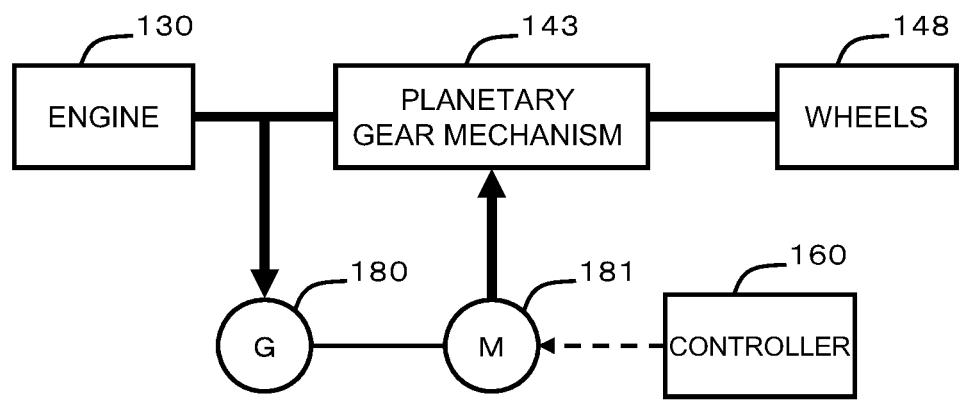
FIG. 9 is a figure showing another construction vehicle that is propelled by the use of an electric motor.

And, with the type shown in FIG. 9, the rotational power of the engine 130 is transmitted via a planetary gear mechanism 143 to each of the wheels 148. The generator 180 uses the output of the engine to generate electricity, and this electrical energy is supplied to the electric motor 181. And the rotational power of the electric motor 181 is added to the rotational power from the engine 130 via a planetary gear mechanism 143. The controller 160 controls the rotational power of the electric motor 181 in order to ensure not to exceed the maximum load of the bucket cylinder 112.

In this manner, it is possible to apply the present invention even to these wheel loaders that use the electric motors 181, so that the reliability and the service life thereof are enhanced.

The embodiments of the present invention described above are examples for explanation of the present invention; the scope of the present invention is not to be considered as being limited only to those embodiments. The present invention can be implemented in various other ways, provided that its gist is not deviated from.

EXPLANATION OF THE REFERENCE SYMBOLS

100: wheel loader, 102: main body, 104: propulsion wheel, 106: working equipment, 108: boom, 108A: bucket stopper, 110: bucket, 112: bucket cylinder, 130: engine, 132: PTO, 134: hydraulic circuit, 136: boom cylinder, 138: propulsion device, 140: clutch, 142: torque converter, 144: transmission, 146: axles, 148: wheels, 150: stroke end sensor, 152: boom angle sensor, 154: clutch output shaft rotational speed sensor, 156: T/M output shaft rotational speed sensor, 158: tilt meter, 160: controller, 161: clutch pressure control unit, 162: T/M control unit, 163: clutch pressure target value determination unit, 164: driving force control determination unit, 165: attitude determination unit, 166: propulsion determination unit, 167: driving force determination unit, 168: tilt determination unit, 170: memory, 172: speed stage storage section, 174: clutch pressure storage section.

The invention claimed is:

1. A construction vehicle comprising:
a propulsion device that outputs propelling force;
a working equipment, whose attitude is variable within a predetermined attitude range, and that is for performing a construction task upon a subject of working; and
a controller that controls said propulsion device;
wherein said controller:
performs attitude determination in which it is determined whether or not the present attitude of said working equipment corresponds to a predetermined attitude within said attitude range;
performs propulsion determination in which it is determined whether or not the present propulsive operation of said propulsion device corresponds to a predetermined propulsive operation that is performed when performing a predetermined construction task in which an over load is imposed upon said working equipment;
performs driving force determination in which it is determined whether or not the magnitude of the present propelling force outputted from said propulsion device corresponds to a predetermined magnitude for which, if a reaction force based upon a larger propelling force is imposed from a subject of working upon said working equipment, an over load will be imposed upon said working equipment; and
reduces the propelling force outputted from said propulsion device in the state in which the results of said attitude determination, said propulsion determination, and said driving force determination are all affirmative.

2. A construction vehicle according to claim 1, wherein said controller:
further performs tilt determination in which it is determined whether or not the present tilt angle of said construction vehicle corresponds to a predetermined angle for which there is no possibility that said construction task is being performed by said working equipment; and
reduces the propelling force outputted from said propulsion device in the state in which the results of said attitude determination, said propulsion determination, and said driving force determination are all affirmative, and moreover the result of said tilt determination is negative.

3. A construction vehicle according to claim 1, wherein:
said propulsion device comprises a modulation clutch whose engagement amount can be variably adjusted, and is adapted to reduce said propelling force more, the more said engagement amount of said modulation clutch is decreased;
and, when reducing said propelling force in the state in which the results of said attitude determination, said propulsion determination, and said driving force determination are all affirmative, said controller:
determines a target engagement amount for said modulation clutch according to said present propelling force; and
reduces the engagement amount of said modulation clutch towards said target engagement amount.

4. A construction vehicle according to claim 3, wherein said controller determines said target engagement amount so that said target engagement amount becomes lower, the larger is said present propelling force.

5. A construction vehicle according to claim 3, wherein if, while the results of said attitude determination, said propulsion determination, and said driving force determination are all affirmative, the result of any one of said attitude determination, said propulsion determination, and said driving force determination changes to negative, said controller raises the engagement amount of said modulation clutch towards its original engagement amount before it was decreased.

6. A construction vehicle according to claim 1, wherein the rate of decrease when said controller decreases the engagement amount of said modulation clutch is higher than the rate of increase when said controller increases the engagement amount of said modulation clutch.

7. A construction vehicle according to claim 1, wherein:
said construction vehicle is a wheel loader;
said working equipment comprises a boom, a bucket, and a bucket cylinder;
said propulsion device comprises a transmission;
said predetermined attitude is said bucket being in its tilt end position and moreover the height position of said bucket being higher than a predetermined height; and
said predetermined propulsive operation is the speed stage of said transmission being a predetermined low speed forward speed stage, and moreover the forward speed of said wheel loader due to said propulsion device being less than or equal to a predetermined low speed.

8. A control device that controls a propulsion device that outputs propelling force, wherein said propulsion device comprises an adjustment device that can adjust said outputted propelling force on the basis of an input value that is inputted thereto, and said control device comprises:
a storage means that stores an input value inputted to said adjustment device;
an attitude determination means that performs attitude determination in which it is determined whether or not the present attitude of a working equipment whose attitude is variable within a predetermined attitude range, and that is for performing a construction task upon a subject of working, corresponds to a predetermined attitude within said attitude range;
a propulsion determination means that performs propulsion determination in which it is determined whether or not the present propulsive operation of said propulsion device corresponds to a predetermined propulsive operation that is performed when performing a predetermined construction task in which an over load is imposed upon said working equipment;
a driving force determination means that performs driving force determination in which it is determined whether or not the magnitude of the present propelling force outputted from said propulsion device corresponds to a predetermined magnitude for which, if a reaction force based upon a larger propelling force is imposed from a subject of working upon said working equipment, an over load will be imposed upon said working equipment; and
a driving force control decision means that makes a decision as to whether or not to decrease said propelling force outputted from said propulsion device, on the basis of the results of said attitude determination, said propulsion determination, and said driving force determination;

a target value determination means that determines a target value for said inputted value, if the result of the decision by said driving force decision means is affirmative; and a driving force control means that controls said propelling force outputted from said propulsion device by determining an input value to be inputted to said adjustment device on the basis of the target value determined by said target value determination means and the input value stored in said storage means, and by inputting said input value that has been determined to said adjustment device.

9. A control device according to claim 8, wherein:

said adjustment device is a clutch that can adjust the propelling force that it outputs on the basis of an inputted clutch pressure value;

said working equipment comprises a boom, a bucket, and a bucket cylinder; and said attitude determination means performs said attitude determination on the basis of the angle of said boom and the angle subtended by said bucket and said boom.

10. A control method that controls a propulsion device that outputs propelling force, wherein said propulsion device comprises an adjustment device that can adjust said outputted propelling force on the basis of an input value that is inputted thereto, and in which:

said input value inputted to said adjustment device is stored;

attitude determination is performed, in which it is determined whether or not the present attitude of a working equipment whose attitude is variable within a predetermined attitude range, and that is for performing a construction task upon a subject of working, corresponds to a predetermined attitude within said attitude range;

performs propulsion determination in which it is determined whether or not the present propulsive operation of said propulsion device corresponds to a predetermined propulsive operation that is performed when performing a predetermined construction task in which an over load is imposed upon said working equipment;

performs driving force determination in which it is determined whether or not the magnitude of the present propelling force outputted from said propulsion device corresponds to a predetermined magnitude for which, if a reaction force based upon a larger propelling force is imposed from a subject of working upon said working equipment, an over load will be imposed upon said working equipment; and:

a decision is made as to whether or not to reduce the propelling force outputted from said propulsion device, on the basis of the results of said attitude determination, said propulsion determination, and said driving force determination are all affirmative;

if the result of said decision is affirmative, said target value for said input value is determined; and an input value to be inputted to said adjustment device is determined on the basis of said target value that has been determined and on the basis of said stored input value, and said propelling force outputted from said propulsion device is controlled by inputting said input value that has been determined to said adjustment device.

* * * * *